United States Patent [19]
Kennedy

[11] Patent Number: 5,709,112
[45] Date of Patent: Jan. 20, 1998

[54] TAMPERPROOF LOCKING AND LATCHING MECHANISM FOR ROTATABLE CONTROLS

[76] Inventor: Steven Kennedy, 197 Sharps Rd., Williamstown, N.J. 08094

[21] Appl. No.: 580,527

[22] Filed: Dec. 28, 1995

[51] Int. Cl.⁶ .................................................. F16K 35/06
[52] U.S. Cl. ........................ 70/177; 70/180; 70/203; 70/212; 74/526; 74/527; 137/385; 251/104; 251/110
[58] Field of Search ................. 70/DIG. 55, 174–180, 70/195, 197, 201–203, 210–212; 137/385; 251/104, 110; 74/526, 527

[56] References Cited

U.S. PATENT DOCUMENTS

| | | |
|---|---|---|
| 4,126,023 | 11/1978 | Smith et al. |
| 4,770,388 | 9/1988 | Carman .................................. 251/104 X |
| 5,183,073 | 2/1993 | Roberts .................................. 70/180 X |

Primary Examiner—Lloyd A. Gall
Attorney, Agent, or Firm—McHale & Slavin, P.A.

[57] ABSTRACT

An improved spring-loaded latching and locking mechanism for a rotatable control of the type having a stem journaled in a body and rotatable about an axis in a boss on the body. The stem has a protuberance for engagement with the handle. The handle comprises a boss-engaging end portion, a stem-engaging portion, a slider-riding portion, and a grip end portion. The slider-riding portion has a slider with a tang extending therefrom. Each side of the slider-riding portion also includes a pair of springs mounted on a rail cutout so that the springs provide resistance against movement of the slider. The slider-riding portion includes an aperture for securing a lock to arrest movement of the slider. The boss has surfaces located to correspond to predetermined positions of the stem. These surfaces are engageable by the tang which, when so engaged, restrains the handle from rotation and prevents removal of the handle from the stem.

6 Claims, 2 Drawing Sheets

TAMPERPROOF LOCKING AND LATCHING MECHANISM FOR ROTATABLE CONTROLS

FIELD OF THE INVENTION

This invention relates generally to valve controls, and in particular, to a ball valve having a handle which includes a projection to interact with the body of the valve to prevent unwanted movement.

BACKGROUND OF THE INVENTION

Control valves to which the instant invention is directed are those with rotatable stems having a valve element rotatable about a stem axis, such as a ball valve, a butterfly valve, or a plug valve. Such valves are rotatable through less than a full revolution to operate between open and closed positions and are frequently used where rapid, efficient cutoff or flow diversion are required. To furnish an external indication of the flow conditions within the valve, or to locate the valve element in a desired flow control position, these valves are fitted with stops against which the valve handle abuts when the valve is in a corresponding operative position. The structure is frequently used on valves having no internal stops for the valve element.

The most common type of valve, the ball valve, is often used where the disposition of the valve element at a particular time is critical to the proper functioning of the overall fluidic system. When valves of this type are located in areas where there is a significant risk of intentional tampering, or where inadvertent opening, closing, or mispositioning of the valve is a possibility, locking and latching means for use with the valve control is a necessity.

U.S. Pat. No. 4,126,023 incorporated herein by reference, which expired on Nov. 22, 1995, provides a latching and locking mechanism for a rotatable control comprising a body having a boss and a stem rotatably mounted in the boss. The mechanism is defined as a handle having a grip end portion and slider-riding and stem-engaging portion. A slider positioned on the slider-riding portion features a tang that extends toward the boss. The boss has recesses having locking surfaces engageable by the tang to restrain the handle from rotation and to prevent removal of the handle axially from the stem when the tang and a locking surface are engaged. The slider-riding portion includes an aperture for receiving a padlock to secure the slider in a fixed position.

This prior art reference, however, has several drawbacks. In particular, the slider-bar is free to move unless a lock is used to secure the slider in position. A lock prevents a user from quickly throwing the valve from one position to another because the lock must first be keyed open and removed. Only after removal of the lock can the slider can be moved upwards and the handle rotated. If, for convenience, the handle is used without a lock, then the handle must always be positioned in such a way that gravity will draw the slider-bar to positively engage the valve locking surfaces. The handle cannot be positioned vertically otherwise the slider-bar will move downwards and away from the locking surface.

Additionally, even if the handle is positioned so that the slider-bar positively engages the locking surface, the slider-bar might still be dislodged due to vibration in the associated machinery or fluid-flow network. Accordingly, a need exists for a latching feature which will not move from its latched position, either with or without the insertion of a lock.

SUMMARY OF THE INVENTION

The instant invention is an improvement upon the prior art by providing a positive mechanism for latching of a handle in either the open or closed position. The invention consists of a dual, slotted key-way that may be modified to an existing shaped handle which allows for the placement of a compression spring thereby forcing the slider-bar, as used in U.S. Pat. No. 4,126,023 in a depressed position. The function of the spring inhibits the slider-bar from movement along the length of the handle without physically engaging the slider-bar and overcoming the spring compression. Spring loading in this manner provides a means for positively engaging the slider-bar into a lockable position further providing an efficient and inexpensive solution to the unpredictable movement of the slider-bar.

Accordingly, a principle object of this invention is to provide a simple and economical locking mechanism, which furnishes significant protection against undesired movement and/or operation of the control with which it is used, especially under conditions of vibration, impact, or stress.

Another object of the invention is to provide a latching mechanism for a valve which ensures that the valve will be disposed only in one of its predetermined operation positions, and will not be inadvertently dislodged despite its operation either with or without a locking means in place.

Yet another object of the invention is to provide a latching mechanism for a valve which includes a slider-bar on its handle which is spring-loaded to keep the slider-bar in positive engagement with set locking positions.

Still another object of the present invention is to provide a latching mechanism for a valve which ensures positive locking engagement, but which is easily and quickly repositionable.

Other objects and advantages of this invention will become apparent from the following description taken in conjunction with the accompanying drawings wherein set forth, by way of illustration and example, are certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
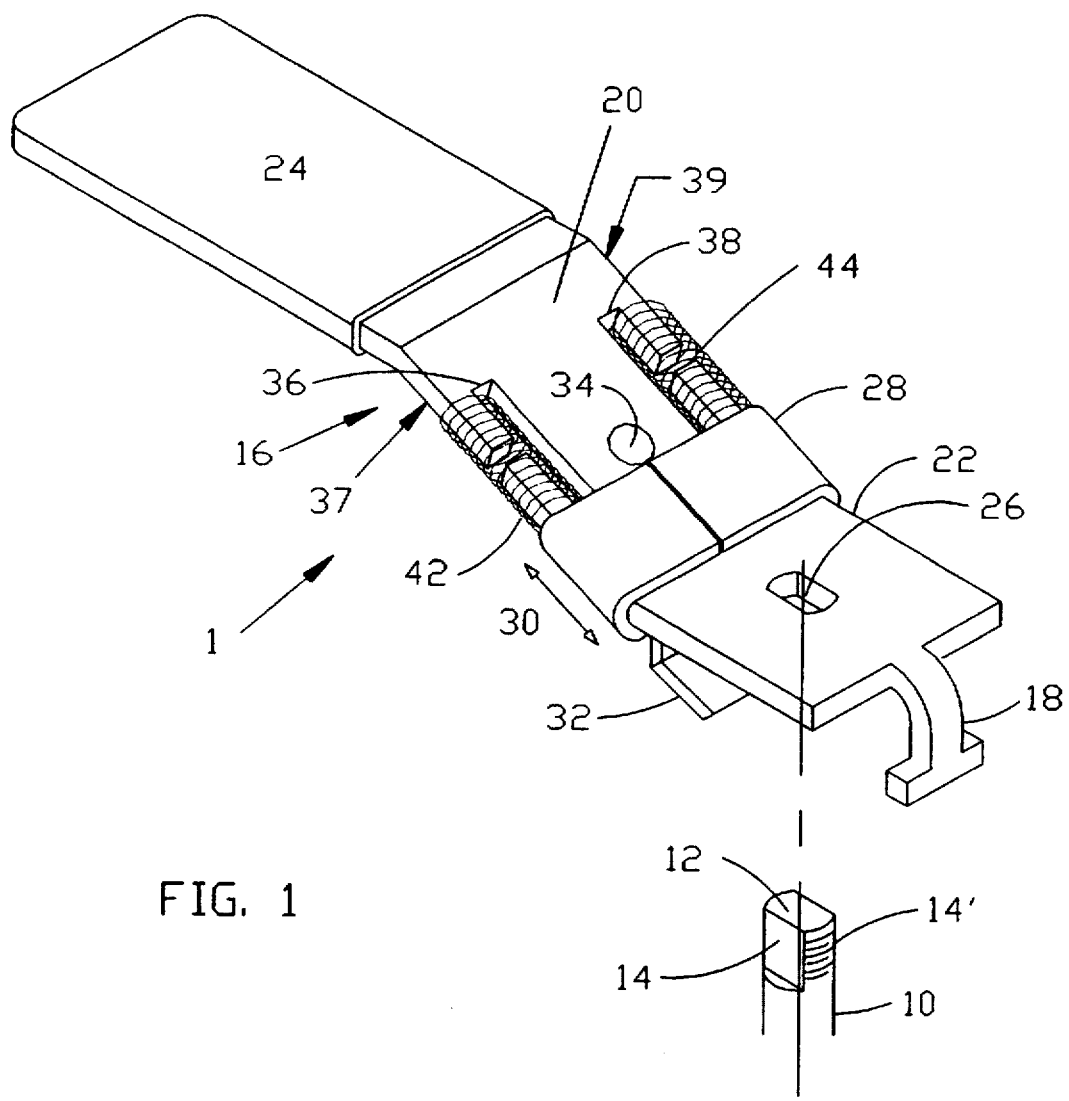
FIG. 1 is an exploded perspective view of the handle and stem of the valve control means as depicted in FIG. 1 of U.S. Pat. No. 4,126,023, with the spring-loaded slider-bar mechanism.

Referring now to FIG. 1, a handle assembly 1 is illustrated which is used in conjunction with a ball valve, not shown, with a portion of a rotatable stem 10 forming a part of a ball valve extending upward. The stem 10 has a protuberance 12 of non-circular cross section, having two opposed flat surfaces, 14 and 14'. The latching and locking components consist of a handle 16 having a boss-engaging end portion 18, a slider-riding portion 42, a stem-engaging portion 22, and a grip end portion 24. The boss-engaging portion 18 is an inverted T-shape structure which extends from the stem engaging portion 22 downwardly. The stem-engaging portion 22 includes slot 26 for receiving the stem protuberance 12. A retaining nut, not shown, holds the handle 16 on the stem 10.

A slider 28 envelopes the slider-riding portion 20 for slidable reciprocal movement in the directions of arrows 30, having tang 32 extending towards the boss of the valve assembly. The slider-riding portion 20 forms an acute angle to the vertical axis of the valve assembly and with aperture 34 providing a means for receiving the shackle of a padlock to secure the slider 28 in a fixed position. Additionally, the grip end portion 24 is fabricated from a material of a thickness and structural shape responsive to the proposed application of force when the mechanism is locked.

Figure 2:
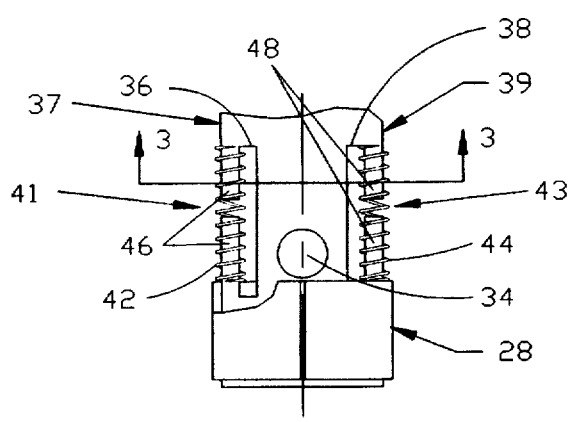
FIG. 2 is a front view of a portion of the handle showing the spring-loaded slider-bar mechanism.

The invention improves upon the prior art by use of a spring loading mechanism for forcing the tang 32 into a continuous engagement with a corresponding locking section on the valve assembly. As shown in this embodiment, the slider-riding portion 20 includes a channel 36 and channel 38 formed parallel to side edge 37 and side edge 39 of slider-riding portion 20. Referring also to FIG. 2, a more detailed frontal view of the spring loading mechanism is shown. Access notches 43 are included which lead from each side edge 37 and side edge 39 to the channels 36 and 38. Notches 41 and 43 are cut wide enough so that circular springs 42 and 44 can be compressed and maneuvered to expand and encompass the rails 46 and 48 as formed between the side edge 37 and side edge 39 and the channels 36 and 38. Upon encompassing the rails 46 and 48, the springs provide positive resistance against movement of the slider-bar 28.

Figure 3:
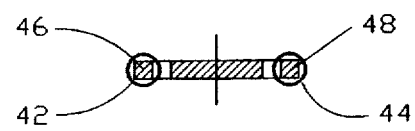
FIG. 3 is a cross-sectional view of FIG. 2 along cut 3—3 showing the spring encompassing the formed rail.

Referring now to FIG. 3, a cross-sectional view of the slider-riding portion 20 is shown. Again, the circular springs 42 and 44 are positioned to expand and encompass the length of the notched (bisected) rails 46 and 48. This configuration is extremely advantageous in its simplicity and functionality. The access notches 41 and 43 provide for easy installation or replacement of the springs. The springs remain contained when fully compressed by movement of the slider-bar 28. It should be noted that the spring can be exchanged to bias against various size loads. However, the major purpose of the spring is to bias the slider 28.

As a result of this modification, the slider-bar and tang will not dislodge from their locked positions when the valve is oriented at different angles. Gravity will not dislodge the slider-bar from its locked position and vibration can not cause disengagement. In this manner, the use of a lock need be only for the OSHA required purposes.

It should be noted that other configurations for spring-loading the slider-bar to positively engage the valve boss assembly might be provided. It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. An improved tamperproof latching mechanism for use with a rotatable control device, said control device having a body having a boss and control means including a stem journaled in the body for rotation about an axis in the boss, said latching mechanism comprising:

a handle with two sides and having a grip end portion and slider-riding and stem-engaging portions;

a slider on the slider-riding portion having a tang for extending toward the boss, the boss having a surface engageable by the tang in a locking position of the slider to restrain the handle from rotation about said axis, said handle having a boss-engaging end portion for extending toward the boss, and said boss having a surface engageable therewith to define a rotational limit position of the handle, said slider being movable to said locking position with the handle located at said limit position, said boss being undercut at said surface to receive said end portion and thereby to prevent removal of said handle axially from said stem while the slider in said locking position; and a spring-loading means for providing positive engagement pressure of said tang with said boss when said tang is in said locking position; wherein said spring-loading means includes: a pair of channels formed in said slider-riding portion of said handle, each said channel being substantially parallel to slider-riding portion sides of the handle, each said channel resulting in the formation of rail between each said portion slide and each said channel; and access notch on each side of said slider-riding portion, each said notch bisecting each said respective rail to provide access to each said respective channel; and a pair of springs, with each said spring being compressed and inserted through each said access notch so that each said spring expands and encircles each said rail; whereby the expanded springs provide positive pressure against said slider and resist its movement.

2. The latching mechanism according to claim 1, wherein said handle is adapted for engagement with a lock to prevent movement of the slider from said locking position.

3. The latching mechanism according to claim 2, wherein said handle has a hole for receiving the shackle of a padlock.

4. The latching mechanism according to claim 1, wherein said boss has two surfaces mutually spaced about said axis of said stem for abutment by said boss-engaging end portion at corresponding rotation limit positions of said handle.

5. The latching mechanism according to claim 4, in which the boss-engaging end portion is T-shaped and said two surfaces of the boss mutually spaced about said axis are undercut to receive said T-shaped end portion and thereby to prevent removal of the handle axially from the stem while the slider is in said locking position.

6. The latching mechanism according to claim 1, wherein said slider-riding portion extends at an acute angle to the axis of the stem.

* * * * *